US006280831B1

(12) United States Patent
Nakanishi et al.

(10) Patent No.: US 6,280,831 B1
(45) Date of Patent: Aug. 28, 2001

(54) TRANSFER PAPER FOR ELECTROPHOTOGRAPHY

(75) Inventors: Ryosuke Nakanishi; Kiyoshi Hosoi, both of Ebina; Masaru Kato; Tomofumi Tokiyoshi, both of Koto-ku, all of (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/374,761

(22) Filed: Aug. 16, 1999

(30) Foreign Application Priority Data

Aug. 17, 1998 (JP) ........................................ 10-230653

(51) Int. Cl.[7] .......................... B32B 29/00; B32B 3/00; B32B 7/00

(52) U.S. Cl. ...................... 428/211; 428/212; 428/218; 428/219; 428/341; 428/537.5; 428/914

(58) Field of Search ................................ 428/211, 212, 428/218, 332, 537.5, 219, 342, 341, 914

(56) References Cited

U.S. PATENT DOCUMENTS 5,663,021 * 9/1997 Hosoi et al. ........................ 430/47
5,885,698 * 3/1999 Takehana et al. .................. 428/212
5,925,446 * 7/1999 Matsuda et al. .................... 428/219

FOREIGN PATENT DOCUMENTS 62-198876 9/1987 (JP) .
5-241366 9/1993 (JP) .

* cited by examiner

*Primary Examiner*—Bruce H. Hess
*Assistant Examiner*—B. Shewareged
(74) *Attorney, Agent, or Firm*—Oliff & Berridge, PLC

(57) ABSTRACT

Provided is transfer paper for electrophotography having high glossiness and high surface smoothness, which is not troubled by paper blistering and toner blistering and is waved or curled little. The transfer paper is constructed by a substrate of which the both surfaces are coated with a coating layer consisting essentially of a pigment and an adhesive, and this has a characteristic in that the permeation flow rate of air (heated at 180° C. and pressurized to have a pressure of 2 $kg/cm^2$) through it is larger than 200 ml/min, or is characterized in that the air permeation flow rate through it is larger than 200 ml/min and not more than 900 ml/min and its internal bonding strength is at least 0.38 N·m.

20 Claims, No Drawings

TRANSFER PAPER FOR ELECTROPHOTOGRAPHY

BACKGROUND OF THE INVENTION

1. Field of the Invention

The present invention relates to transfer paper for electrophotography, which is used in indirect dry-type electrophotographic full-color duplicators and printers. Precisely, it relates to coated transfer paper for electrophotography having the advantages of high glossiness, no blister in image fixation through simplex and duplex printing, and high-quality image formation.

2. Description of the Related Art

The recent tendency in the art is toward high-speed duplication in duplicators and printers to give high-quality color images. In particular, in the field of on-demand publications, color duplicators and color printers are being much used for producing publications which have heretofore been produced in an ordinary printing method, as being relatively easy to use for producing a small number of publications.

In general, conventional coated paper with high glossiness is produced by applying a pigment having a mean particle size of at most 2 microns onto base paper in an amount of at lest 10 g/$M^2$ for each side, through coating with various coaters, followed by smoothening the coated surface through calendering. The coated paper with high glossiness is generally used in the field of commercial printing, but is being much used in electrophotographic duplicators and printers, in place of ordinary PPC paper or copying paper, to increase the sharpness of images to be printed thereon.

However, using the coated paper with high glossiness in electrophotographic duplicators and printers is problematic in that it is often blistered while toner images are fixed thereon under heat. Blistering as referred to herein includes the following: While toner images are fixed on paper under heat, water existing in the paper is heated to vaporize, whereby the water vapor pressure in the paper increases. The water vapor is discharged outside the paper, but if not smoothly discharged for some reasons, it will rapidly expand inside the base paper to give local blisters. This is hereinafter referred to as paper blistering.

Another is as follows: The high-pressure water vapor having been formed inside the paper shall be discharged out through the void in the coating layer. However, if toner images are on the paths through which the water vapor is being discharged out, the water vapor will break the toner images to flow outside. In that condition, the coated paper shall have fine blisters or through-holes, is thereby degraded. This is hereinafter referred to as toner blistering. The toner blistering produces serious image defects.

Owing to its coating layer, the coated paper could not ensure sufficient water vapor discharging paths. When having toner images thereon, it is often troubled by paper blistering and toner blistering. In particular, the coated paper with high glossiness requires calendering for increasing its glossiness. However, calendering increases the density of the coating layer, and the calendered coated paper will be much more troubled by paper blistering and toner blistering.

The blistering occurs more frequently in duplex printing than in simplex printing. This is because, in duplex printing, toner adheres first on one surface of the coating layer to form toner images thereon, and thereafter on the other surface thereof also to form toner images thereon. In the latter step of such duplex printing, the water vapor having been formed in the paper is more difficult to go out than that to go out in simplex printing. Conventional coated paper with high glossiness for ordinary printing and that for electrophotographic printing are blistered only a little or are not blistered in simplex printing, but are significantly blistered in duplex printing.

For overcoming blistering of coated paper for electrophotography, some methods have heretofore been proposed. One comprises controlling the center line average height of the surface of the coating layer to be at most 2.0 $\mu$m and controlling the air permeability of the coating layer to be at most 4000 seconds (see JP-A 62-198876); and another comprises controlling the smoothness and the air permeability of the base paper to be coated and specifically defining the amount of the coating layer that contains an organic pigment to thereby control the air permeability of the coating layer to be at most 4000 seconds (see JP-A 5-241366). The air permeability is measured according to an Ohken's air permeability test method stipulated in Japan Tappi No. 5 (this accords with JIS P8117), in which is measured the time (in terms of seconds) as taken by 10 ml of air passing through paper under a pressure of 0.1 kg/$cm^2$, and the time thus measured indicates the vapor permeability of the paper tested.

However, those types of coated paper for electrophotography proposed as above are still problematic in that they are often troubled by paper blistering and toner blistering in duplex printing though little in simplex printing. The reason will be because, in simplex printing, water vapor discharge from the toner image-formed surface of the paper is difficult but is easy from the opposite surface thereof, and therefore the printed paper is blistered little. However, in duplex printing, the toner images formed shall cover the both surfaces of the paper, and the vapor permeability of the paper will be not enough for smooth water vapor discharge in that condition.

SUMMARY OF THE INVENTION

Given that situation, the present invention is to overcome the problems as above and to provide transfer paper for electrophotography which has the advantages of high glossiness and high surface smoothness and which is not troubled by paper blistering and toner blistering and is waved or curled little.

We, the present inventors have assiduously studied for solving the problems with transfer paper for electrophotography having the advantages of high glossiness and high surface smoothness, and, asa result, have found that, in transferpaper for electrophotography as prepared by coating the both surfaces of base paper with a coating layer consisting essentially of a pigment and an adhesive to have an increased degree of glossiness, when the air permeation flow rate through the transfer paper is controlled to be not lower than a predetermined value, or in the transfer paper through which the airpermeation flow rate is lower than the predetermined value, when its internal bonding strength is ensured to be not lower than a predetermined value, then the problems with the transfer paper for electrophotography as above are all solved. On the basis of these findings, we have completed the present invention. Specifically, the constitution of the invention is as follows:

(1) Transfer paper for electrophotography, which includes;

a substrate of which the both surfaces are coated with a coating layer consisting essentially of a pigment and an adhesive, and is characterized in that;

the permeation flow rate through it of air having been heated at 180° C. and pressurized to have a pressure of 2 $kg/cm^2$ is larger than 200 ml/min.

Preferably;

the air permeation flow rate through the transfer paper is larger than 200 and not more than 900 ml/min, the coating layer on at least one surface of the substrate has a degree of glossiness of at least 50%, the coating layer has a density of at most 1.20 $g/cm^3$, more preferably at most 1.10 $g/cm^3{}_1$ , the pigment to be in the coating layer is at least one selected from organic pigments, delaminated clay, and pillar-shaped pigments, the coating layer has a multi-layered structure, the weight of the transfer paper falls between 70 $g/m^2$ and 220 $g/m^2$, the water content of the transfer paper falls between 3.0% and 6.5%, more preferably between 4.5% and 5.5%.

(2) Transfer paper for electrophotography, which comprises;

a substrate of which the both surfaces are coated with a coating layer consisting essentially of a pigment and an adhesive, and is characterized in that;

the permeation flow rate through it of air having been heated at 180°C. and pressurized to have a pressure of 2 $kg/cm^2$ falls between 50 ml/min and 200 ml/min, and that its internal bonding strength is at least 0.38 N·m.

Preferably;

the coating layer on at least one surface of the substrate has a degree of glossiness of at least 50%, the coating layer has a density of at most 1.20 $g/cm^3$, more preferably at most 1.10 $g/cm^3$, the substrate consists essentially of pulp and at least 30% of the pulp is needle-leaf bleached kraft pulp (NBKP), the weight of the transfer paper falls between 70 $g/m^2$ and 220 $g/m^2$, the water content of the transfer paper falls between 3.0% and 6.5%, more preferably between 4.5 % and 5.5%, the internal bonding strength of the transfer paper falls between 0.38 N·m and 0.8 N·m, more preferably between 0.4 N·m and 0.7 N·m.

The transfer paper of (1) and (2) is favorable to duplex printing.

DETAILED DESCRIPTION OF THE INVENTION

The invention is described in detail hereinunder.

We, the present inventors have studied various factors of coated paper for electrophotography, and have found that, when the air permeability through the paper is increased to such a degree that water vapor having been formed in the paper in the step of toner image fixation under heat is well discharged outside, or even when not, if the internal bonding strength of the paper is increased to such a degree that the paper is well resistant to the pressure of water vapor having been formed therein, then the paper is satisfactorily applicable to duplex printing without being troubled by paper blistering or toner blistering.

The reason why toner blistering of transfer paper could be inhibited by increasing the internal bonding strength of the paper is described. In coated paper of which the internal bonding strength is low, water vapor having been formed therein during toner image fixation under heat immediately diffuses from the fibrous layer of the substrate to the coating layer, and the resulting high-pressure water vapor passes through the void space in the coating layer to break the overlying toner layer. However, in coated paper of which the internal bonding strength is increased, the fibrous layer is well resistant to the pressure of water vapor, and water vapor will gradually diffuse through the fibrous layer. Accordingly, the water vapor pressure in the fibrous layer is lowered, and the water vapor passing through the void space in the coating layer shall have a lowered pressure and therefore will not break the toner layer.

In this connection, we, the present inventors paid special attention to the fixation heat to be applied to transfer paper, by which the synthetic adhesive existing in the coating layer is softened to change the vapor permeability of the coating layer. Taking it into consideration, we decided to employ the permeation flow rate per unit time of air (this is heated at 180° C. and pressurized to have a pressure of 2 $kg/cm^2$) that passes through transfer paper, as one index in designing transfer paper.

For coated paper having high glossiness, through which the permeation flow rate of air having been heated at 180° C. and pressurized to have a pressure of 2 $kg/cm^2$ is larger than 200 ml/min, even when water vapor is formed therein during toner image fixation under heat in duplex printing, the void space inside the paper, especially inside the coating layer is enlarged by the fixation heat, whereby the water vapor formed is surely discharged outside the paper. In that condition, therefore, the printed paper is not troubled by paper blistering and toner blistering. The uppermost limit of the air permeation flow rate may be around 900 ml/min.

However, if the permeation flow rate of air (heated at 180° C. and pressurized to have a pressure of 2 $kg/cm^2$) through transfer paper is not larger than 200 ml/min, the printed paper will be troubled by paper blistering and toner blistering. In this case, if the internal bonding strength of the paper is controlled to be at least 0.38 N·m, the paper is not blistered even though its one surface is coated with toner images. In that condition, water vapor having been formed in the paper does not break the inside structure of the paper and does not break the toner image formed on the paper, and therefore, the printed paper is not blistered. The uppermost limit of the internal bonding strength of the paper may be around 0.8 N·m, but preferably around 0.7 N·m. However, if the permeation flow rate of air (heated at 180° C. and pressurized to have a pressure of 2 kg/cm2) through transfer paper is smaller than 50 ml/min, blistering the paper could not be prevented even when the internal bonding strength of the paper is increased. More preferably, in the invention, the air permeation flow rate through the transfer paper is larger than 200 ml/min, or falls between 100 and 200 ml/min, and the internal bonding strength of the transfer paper falls between 0.40 and 0.70 N·m.

Also preferably, the weight of the transfer paper for electrophotography of the invention falls between 70 and 220 $g/m^2$. If its weight is smaller than 70 $g/m^2$, too much heat will be applied to the paper during image fixation, whereby the water vapor pressure in the paper will much increase. If so, breaking the paper by the water vapor pressure could not be prevented even when the. air permeability through the paper and the internal bonding strength of the paper could be increased. If, on the other hand, the weight of the paper is larger than 220 $g/m^2$, the quantity of heat applicable to the paper will be small and the water vapor pressure in the paper will be also small. In that condition, the paper could be prevented from blistering. However, the quantity of heat needed by the paper to be heated increases too much, thereby resulting in that the quantity of heat for toner fixation on the paper will be unsatisfactory.

Also preferably, the original water content of transfer paper of the invention falls between 3.0 and 6.5%, when measured just after the paper is uncovered and exposed in the ambient air. If the original water content of the paper is smaller than 3.0%, the water vapor pressure in the paper being processed for printing will be small. However, the paper having such a small original water content will absorb much water to have an equilibrated water content only within a short period of time, after having been uncovered and exposed in the ambient air, and it will be readily waved or curled. If, on the other hand, the original water content of the paper is larger than 6.5%, the water vapor pressure in the paper being processed for printing will increase too much, whereby the printed paper will be blistered. In addition, the paper having such a large original water content is further problematic in that the coating layer is often blocked in the step of coating the substrate with it to produce coated paper, or is dusted much while the coating layer is calendered, and that the printed paper is unfavorably waved or curled. For these reasons, the paper having a large original water content is not practicable.

The pulp to be used in the substrate for the transfer paper for electrophotography of the invention is not specifically defined, and any and every ordinary pulp for the substrate for ordinary coated paper is employable herein. For example, it includes sulfite pulp, kraft pulp, semichemical pulp, chemiground pulp, ground wood pulp, refiner-ground pulp, thermomechanical pulp, waste paper pulp from waste newspaper, waste magazine paper, high-quality waste paper, etc. One or two or those may be used either singly or as combined.

The substrate for use in the invention contains a filler, which is for improving the coatability of the substrate and controlling its opacity and brightness of the coated substrate. The filler employable herein includes inorganic fillers such as ground calcium carbonate, precipitated calcium carbonate, kaolin, calcined clay, pyrophyllite, sericite, talc and other silicates, and also titanium dioxide, etc.; and organic fillers such as urea resins, styrene resins, etc. However, these are not limitative. The amount of the filler to be in the substrate may fall between 3 and 20% by weight, but preferably between 5 and 15% by weight.

Various chemicals such as sizing agents and others to be in the substrate for use in the invention may be previously added thereto while it is prepared, or may be applied later thereto after it has been prepared. Various types of sizing agents are usable herein, including, for example, rosin-type sizing agents, synthetic sizing agents, petroleum resin-type sizing agents, neutral sizing agents, etc. Suitable sizing agents such as alumina sulfate, cationated starch and the like may be combined with fiber fixers. In view of the storage stability of the transfer paper having been printed in electrophotographic duplicators or printers, preferred are neutral sizing agents, for example, alkenylsuccinic anhydride-type sizing agents, alkylketene dimers, alkenylketene dimers, neutral rosins, petroleum sizes, olefinic resins, styrene-acrylic resins, etc.

The substrate for use in the invention may contain any of inorganic substances such as sodium chloride, potassium chloride, calcium chloride, sodium sulfate, zinc oxide, titanium dioxide, tin oxide, aluminium oxide, magnesium oxide and others, and organic substances such as alkyl phosphates, alkyl sulfates, sodium sulfonates, quaternary ammonium salts and others, which are for the purpose of controlling the surface resistance value of the substrate. The substrate may contain any one or more of these additives either singly or as combined.

Apart from them, the substrate may further contain any other ordinary auxiliary agents to be in substrates for coated paper, for example, paper strength enhancers, dyes, pH controlling agents, etc.

For increasing the internal bonding strength of the substrate for use in the invention, any method is employable in accordance with the object of the transfer paper to be produced herein. For example, the type of pulp to be used is specifically selected from the materials noted above (e.g., NBKP pulp with high rigidity is used), or the pulp to be the substrate is forcedly beaten to increase its interfiber bonding, or a paper strengthening agent is added, or a resin is applied to pulp through dipping or coating.

The pigment to be in the coating layer of the transfer paper of the invention may be any and every one generally used for ordinary coated paper, including, for example, mineral pigments such as ground calcium carbonate, precipitated calcium carbonate, titanium oxide, aluminium hydroxide, satin white, talc, calcium sulfate, barium sulfate, zinc oxide, magnesium oxide, magnesium carbonate, amorphous silica, colloidal silica, white carbon, kaolin, calcined kaolin, delaminated clay, aluminosilicates, sericite, bentonite, smectite, etc.; and solid or porous organic pigments consisting essentially of styrene resins such as polystyrene, polymethylstyrene or the like, acrylic resins such as polymethyl methacrylate, polymethyl acrylate, polyacrylonitrile or the like, as well as styrene-acrylic resins, urea-formaldehyde resins, polyvinyl chlorides, polycarbonates, etc. One or more of these pigments are usable herein either singly or as combined.

The adhesive to be in the coating layer in the invention may be any known one, including, for example, synthetic adhesives such as various copolymers of styrene-butadiene copolymers, styrene-acrylic copolymers, ethylene-vinyl acetate copolymers, butadiene-methyl methacrylate copolymers, vinyl acetate-butyl acrylate copolymers, etc., as well as polyvinyl alcohols, maleic anhydride copolymers, acrylic acid-methyl methacrylate copolymers, etc.; and natural adhesives such asoxidized starch, esterified starch, enzyme-modified starches, and cold water-soluble starches to be derived from them through flash-drying, as well as casein, soybean protein, etc. The amount of the adhesive to be in the coating layer may fall between 5 and 50 parts by weight, but preferably between 10 and 30 parts by weight, relative to 100 parts by weight of the pigment therein. If desired, the coating layer may further contain various auxiliary agents that may be added to pigments for ordinary coated paper, for example, dispersants, thickeners, water-retaining agents, defoaming agents, water-proofing agents, etc.

The coating composition prepared in the manner noted above may be applied onto a substrate to form a single coating layer or plural coating layers thereon in an on-machine process or an off-machine process, for which may be used any ordinary coating devices that are generally used in producing ordinary coated paper. The coating devices include, for example, blade coaters, air knife coaters, roll coaters, reverse coaters, bar coaters, curtain coaters, die-slotting coaters, gravure coaters, etc. The coating layer to be formed on the substrate may have a dry weight of from 5 to 50 $g/m^2$ of one surface, but preferably from 10 to 30 $g/m^2$ of one surface.

To smooth the surface of the coating layer having been formed on the substrate, any ordinary smoothing device is employable. For example, employable is any of supercalenders, machine calenders, soft-nip calenders, etc. After having been thussmoothed, the coated paper shall have a degree of glossiness of at least 50 %, but preferably at least 60%. It is desirable that the density of the coating layer is at most 1.20 g/cm$^3$, more preferably at most 1.10 g/cm$^3$.

For increasing the permeation flow rate of air (heated at 180° C. and pressurized to have a pressure of 2 kg/cm$^2$) through the coated paper, the materials constituting the coating layer and also the methods of forming the coating layer shall be suitably selected from those noted above. For example, pigments capable of being well oriented after calendering (e.g., organic pigments, delaminated clay, pillar-shaped pigments, etc.) will be specifically selected, or the coating layer will be formed to have a multi-layered structure, or the roll temperature for finish calendering is increased. Depending on the object of the coated paper to be prepared, these means may be suitably combined. In the multi-layered structure of the coating layer, the lower layer is for sealing the substrate, by which the surface smoothness of the upper layer is improved and the coated paper could easily have an increased degree of glossiness.

The transfer paper of the invention is so controlled that its original water content just after the paper is uncovered to be exposed in the ambient air falls between 3.0 and 6.5%, but preferably between 4.5 and 5.5%, for which the drying condition in the papermaking machine and in the coater and also the calendering condition shall be well controlled. In order that the transfer paper does not absorb or desorb water while it is stored, it is wrapped or packaged with waterproof wrapping or packing paper such as polyethylene laminate paper or the like or with polypropylene or the like.

The invention is described in more detail with reference to the following Examples, which, however, are not intended to restrict the scope of the invention.

EXAMPLE 1

Precipitated calcium carbonate (TP-121 from Okutama Industry) to be 10% by weight was added to a pulp slurry composed of 90 parts of LBKP (freeness (CSF)=280 ml) and 10 parts of NBKP (freeness (CSF)=440ml). To this were added 2parts based on the pulp of starch, 1.5 parts based on the same of rosin sizing agent, and 2 parts based on the same of alumina sulfate. The resulting paper stock was made into paper, using a Fourdrinier papermaking machine. The resulting wet paper was coated with starch oxide (Ace A from Ohji Corn Starch), of which the dry weight coated was to be 2.0 g/m$^2$, in a size-pressing device. After dried, this was calendered with a machine calender to have a degree of surface smoothness as measured with an Ohken's surface smoothness tester of 30 seconds. The substrate thus prepared weighed 75 g/m$^2$.

Next, a pigment component comprised of 15 parts by weight of precipitated calcium carbonate (TP-123 from Okutama Industry), 65 parts by weight of kaolin (Ultrawhite 90 from Engelhard) and 20 parts by weight of organic pigment (OP-84J from Nippon Zeon) was mixed with 3 parts by weight, relative to 100 parts by weight of the pigment component, of starch oxide (Ohji Ace B from Ohji Corn Starch) serving as an adhesive, 11 parts by weight, relative to the same, of synthetic adhesive (JSR0668 from Nippon Synthetic Rubber) and 0.3 parts by weight, relative to the same, of dispersant (Aron T-40 from Toa Gosei) to prepare a coating composition. The composition was applied to the both surfaces of the substrate prepared previously, using a blade coater. The amount of the composition coated was 15 g/m$^2$ of one surface. Then, the thus-coated substrate was calendered with a supercalender having a roll temperature of 50° C. After having been thus processed, this had a glossiness (75-degree glossiness according to JIS P-8142) of 69%, and a water content of 4.8%. The transfer paper for electrophotography of Example 1 thus produced had a weight of 105 g/m2. Immediately after having been produced, the transfer paper was put into a moistureproof bag so as to protect it from the ambient moisture, and stored. Its quality was evaluated according to the test methods mentioned hereinunder, and the test data obtained are shown below. The others produced in the following Examples and Comparative Examples were stored and tested also in the same manner as herein.

EXAMPLE 2

A pigment component comprised of 20 parts by weight of precipitated calcium carbonate (TP-123 from Okutama Industry) and 80 parts by weight of kaolin (Ultrawhite 90 from Engelhard) was mixed with 3 parts by weight, relative to 100 parts by weight of the pigment component, of starch oxide (Ohji Ace B from Ohji Corn Starch) serving as an adhesive, 11 parts by weight, relative to the same, of synthetic adhesive (JSR0668 from Nippon Synthetic Rubber) and 0.3 parts by weight, relative to the same, of dispersant (Aron T-40 from Toa Gosei) to prepare a coating composition. The composition was applied to the both surfaces of the substrate prepared in Example 1, using a blade coater. The amount of the composition coated was 15 g/m$^2$ of one surface. Then, the thus-coated substrate was calendered with a soft-nip calender having a roll temperature of 150° C. After having been thus processed, this had a glossiness (75-degree glossiness according to JIS P-8142) of 64%, and a water content of 4.9%. The transfer paper for electrophotography of Example 2 thus produced had a weight of 105 g/m$^2$.

EXAMPLE 3

Precipitated calcium carbonate (TP-121 from Okutama Industry) to be 10% by weight was added to a pulp slurry composed of 70 parts of LBKP (freeness (CSF)=310 ml) and 30 parts of NBKP (freeness (CSF)=440 ml). To this were added 0.2 parts based on the pulp of alkenylsuccinic anhydride, 0.5 parts based on the same of cationated starch and 0.8 parts based on the same of polyacrylamide resin (Harmide EX360 from Harima Chemical), all serving as an internal sizing agent. he resulting paper stock was made into paper, using a Fourdrinier papermaking machine. The resulting wet paper was coated with starch oxide (Ace A from Ohji Corn Starch), of which the dry weight coated was to be 2.0 g/m$^2$, in a size-pressing device. After dried, this was calendered with a machine calender to have a degree of surface smoothness as measured with an Ohken's surface smoothness tester of 30 seconds. The substrate thus prepared weighed 75 g/m$^2$.

Next, a pigment component comprised of 30 parts by weight of precipitated calcium carbonate (TP-123 from Okutama Industry) and 70 parts by weight of kaolin (Ultrawhite 90 from Engelhard) was mixed with 3 parts by weight, relative to 100 parts by weight of the pigment component, of starch oxide (Ohji Ace B from Ohji Corn Starch) serving as an adhesive, 11 parts by weight, relative to the same, of synthetic adhesive (JSR0668 from Nippon Synthetic Rubber) and 0.3 parts by weight, relative to the same, of dispersant (Aron T-40 from Toa Gosei) to prepare a coating composition. The composition was applied to the both surfaces of the substrate prepared previously, using a blade coater. The amount of the composition coated was 15 g/$m^2$ of one surface. Then, the thus-coated substrate was calendered with a supercalender having a roll temperature of 50° C. After having been thus processed, this had a glossiness (75-degree glossiness according to JIS P-8142) of 63%, and a water content of 5.1%. The transfer paper for electrophotography of Example 2 thus produced had a weight of 105 g/$m^2$.

EXAMPLE 4

Precipitated calcium carbonate (TP-121 from Okutama Industry) to be 10% by weight was added to a pulp slurry composed of 40 parts of LBKP (freeness (CSF)=350 ml) and 60 parts of NBKP (freeness (CSF)=440 ml). To this were added 2 parts based on the pulp of starch, 1.5 parts based on the same of rosin sizing agent, and 2 parts based on the same of alumina sulfate. The resulting paper stock was made into paper, using a Fourdrinier papermaking machine. The resulting wet paper was coated with starch oxide (Ace A from Ohji Corn Starch), of which the dry weight coated was to be 2.0 g/$m^2$, in a size-pressing device. After dried, this was calendered with a machine calender to have a degree of surface smoothness as measured with an Ohken's surface smoothness tester of 30 seconds. The substrate thus prepared weighed 75 g/$m^2$.

Next, a pigment component comprised of 30 parts by weight of precipitated calcium carbonate (TP-123 from Okutama Industry) and 70 parts by weight of kaolin (Ultrawhite 90 from Engelhard) was mixed with 3 parts by weight, relative to 100 parts by weight of the pigment component, of starch oxide (Ohji Ace B from Ohji Corn Starch) serving as an adhesive, 11 parts by weight, relative to the same, of synthetic adhesive (JSR0668 from Nippon Synthetic Rubber) and 0.3 parts by weight, relative to the same, of dispersant (Aron T-40 from Toa Gosei) to prepare a coating composition. The composition was applied to the both surfaces of the substrate prepared previously, using a blade coater. The amount of the composition coated was 15 g/$m^2$ of one surface. Then, the thus-coated substrate was calendered with a supercalender having a roll temperature of 50° C. After having been thus processed, this had a glossiness (75-degree glossiness according to JIS P-8142) of 66%, and a water content of 4.7 %. The transfer paper for electrophotography of Example 4 thus produced had a weight of 105 g/$m^2$.

EXAMPLE 5

Precipitated calcium carbonate (TP-121 from Okutama Industry) to be 10% by weight was added to a pulp slurry composed of 60 parts of LBKP (freeness (CSF)=310 ml) and 40 parts of NBKP (freeness (CSF)=440 ml). To this were added 2 parts based on the pulp of starch, 1.5 parts based on the same of rosin sizing agent, and 2 parts based on the same of alumina sulfate. The resulting paper stock was made into paper, using a Fourdrinier papermaking machine. The resulting wet paper was coated with starch oxide (Ace A from Ohji Corn Starch), of which the dry weight coated was to be 2.0 g/$m^2$, in a size-pressing device. After dried, this was calendered with a machine calender to have a degree of surface smoothness as measured with an Ohken's surface smoothness tester of 30 seconds. The substrate thus prepared weighed 75 g/$m^2$.

Next, a pigment component of precipitated calcium carbonate (TP-222H from Okutama Industry) was mixed with 8 parts by weight, relative to 100 parts by weight of the pigment component, of starch oxide (Ohji Ace B from Ohji Corn Starch) serving as an adhesive, 3 parts by weight, relative to the same, of synthetic adhesive (JSR0668 from Nippon Synthetic Rubber) and 0.5 parts by weight, relative to the same, of dispersant (Aron T-40 from Toa Gosei) to prepare a coating composition. The composition was applied to the both surfaces of the substrate prepared previously, using a blade coater. The amount of the composition coated was 5 g/$m^2$ of one surface.

Next, another pigment composition comprised of 20 parts by weight of pecipitated calcium carbonate (TP-222H from Okutama Industry) and 80 parts by weight of kaolin (Ultrawhite 90 from Engelhard) was mixed with 6 parts by weight, relative to 100 parts by weight of the pigment component, of starch oxide (Ohji Ace B from Ohji Corn Starch) serving as an adhesive, 9 parts by weight, relative to the same, of synthetic adhesive (JSR0668 from Nippon Synthetic Rubber) and 0.3 parts by weight, relative to the same, of dispersant (Aron T-40 from Toa Gosei) to prepare another coating composition. The composition was further applied to the both surfaces of the previously-coated substrate as above, using a blade coater. The amount of the composition coated was 10 g/$m^2$ of one surface. Then, the thus-coated substrate was calendered with a supercalender. After having been thus processed, this had a glossiness (75-degree glossiness according to JIS P-8142) of 63%, and a water content of 5.0%. The transfer paper for electrophotography of Example 5 thus produced had a weight of 105 g/$m^2$.

EXAMPLE 6

The same process as in Example 1 was repeated, except that the substrate prepared and used herein had a weight of 98 g/$m^2$ but not 75 g/$m^2$. The transfer paper herein produced weighed 128 g/$m^2$.

EXAMPLE 7

The same process as in Example 1 was repeated, except that the substrate prepared and used herein had a weight of 127 g/$m^2$ but not 75 g/$m^2$. The transfer paper herein produced weighed 157 g/$m^2$.

COMPARATIVE EXAMPLE 1

A pigment component comprised of 30 parts by weight of precipitated calcium carbonate (TP-123 from Okutama Industry) and 70 parts by weight of kaolin (Ultrawhite 90 from Engelhard) was mixed with 3 parts by weight, relative to 100 parts by weight of the pigment component, of starch oxide (Ohji Ace B from Ohji Corn Starch) serving as an adhesive, 11 parts by weight, relative to the same, of synthetic adhesive (JSR0668 from Nippon Synthetic Rubber) and 0.3 parts by weight, relative to the same, of dispersant (Aron T-40 from Toa Gosei) to prepare a coating composition. The composition was applied to the both surfaces of the substrate prepared in Example 1, using a blade coater. The amount of the composition coated was 15 g/$m^2$ of one surface. Then, the thus-coated substrate was calendered with a supercalender having a roll temperature of 50° C. After having been thus processed, this had a glossiness (75-degree glossiness according to JIS P-8142) of 66%, and a water content of 4.9%. The transfer paper for electrophotography of Comparative Example 1 thus produced had a weight of 105 g/$m^2$.

COMPARATIVE EXAMPLE 2

The same process as in Example 1 was repeated to produce transfer paper for electrophotography of Comparative Example 2, except that the supercalendering condition for the coated paper was so controlled that the calendered paper could have a water content of 2.5%.

COMPARATIVE EXAMPLE 3

Commercially-available coated paper for printing (OK Topcoat from Ohji Papermaking, having a weight of 104.7 g/m$^2$) was used as the transfer paper for electrophotography of Comparative Example 3.

COMPARATIVE EXAMPLE 4

Commercially-available coated paper for printing (OK Topcoat from Ohji Papermaking, having a weight of 127.9 g/m$^2$) was used as the transfer paper for electrophotography of Comparative Example 4.

COMPARATIVE EXAMPLE 5

Commercially-available coated paper for printing (NK Highcoat from Nippon Paperprocessing, having a weight of 157 g/m$^2$) was used as the transfer paper for electrophotography of Comparative Example 5.

QUALITY EVALUATION METHODS

Samples of electrophotographic transfer paper as produced in Examples 1 to 7 and Comparative Examples 1 to 5 were measured and tested for their properties according to the methods mentioned below.

(1) Weight of Transfer Paper:

Measured according to JIS P-8124.

(2) Density of Transfer Paper:

Measured according to JIS P-8118.

(3) Glossiness of Transfer Paper:

Measured according to JIS P-8142, at an angle of 75 degrees.

(4) Hot Pressure Air Permeation Flow Rate through Transfer Paper:

Using a hot pressure-type-vapor permeability tester (from Asahi Seiko), the permeation flow rate of air (temperature: 180° C., pressure: 2 kg/cm$^2$) through transfer paper was measured.

(5) Internal Bonding Strength of Transfer Paper:

Using an internal bonding strength tester (Model No. 2085-D from Kumagaya Riki Kogyo), the internal bonding strength of transfer paper was measured.

(6) Original Water Content of Transfer Paper Immediately After Having Been Uncovered to be Exposed in the Ambient Air:

Measured according to JIS P-8127.

(7) Paper Blistering:

A digital color duplicator for dry indirect electrophotography, Fuji Xerox's Docucolor 4040, was used for testing transfer paper for paper blistering under two conditions, 28° C. and 85% RH, and 22° C. and 55% RH. Briefly, the original to be copied had a three-color 100%-dot image of cyan, magenta and yellow. In the duplication test using the duplicator as above, the original was copied on samples of transfer paper for simplex printing and duplex printing. For the duplex printing, the transfer paper was so aligned that its both surfaces could have the same image on the same position. The samples to be duplicated were uncovered just before the test, and printed on their one surface only (simplex printing). After one minute, they were again printed on the opposite surface (duplex printing). Samples with no paper blistering were evaluated good (0), while those with some paper blistering were evaluated bad (x).

(8) Toner Blistering:

A digital color duplicator for dry indirect electrophotography, Fuji Xerox's Docucolor 4040, was used for testing transfer paper for toner blistering under two conditions, 28° C. and 85% RH, and 22° C. and 55% RH. Briefly, the original to be copied had a three-color 100%-dot image of cyan, magenta and yellow. In the duplication test using the duplicator as above, the original was copied on samples of transfer paper for simplex printing and duplex printing. For the duplex printing, the transfer paper was so aligned that its both surfaces could have the same image on the same position. The samples to be duplicated were uncovered just before the test, and printed on their one surface only (simplex printing). After one minute, they were again printed on the opposite surface (duplex printing). The samples tested were evaluated according to the following four-rank criteria:

A: Samples had no toner blistering.

B: Samples had some toner blistering, which, however, could not be seen with eyes.

C: Toner blistering in samples was seen with eyes, and it disturbed the image.

D: Toner blistering in samples was felt when touched, and it lowered the image glossiness.

(9) Waving or Curling of Transfer Paper:

After having been uncovered and exposed to the ambient air, samples of transfer paper were printed on their one surface (simplex printing) under the condition of 28° C. and 85% RH. After left for one minute, the printed samples were checked as to whether or not they were waved or curled. The printed samples were evaluated according to the following four-rank criteria:

A: Samples were neither waved nor curled.

B: Samples were waved or curled in some degree.

C: Samples were waved or curled, but were acceptable.

D: Samples were greatly waved or curled to such a degree that they were difficult to run for duplex printing.

TABLE 1

| | Example | | | | | | |
|---|---|---|---|---|---|---|---|
| | 1 | 2 | 3 | 4 | 5 | 6 | 7 |
| Weight of Transfer Paper (g/m$^2$) | 105 | 105 | 105 | 105 | 105 | 128 | 157 |
| Density of Transfer Paper (g/cm$^3$) | 1.02 | 1.01 | 1.10 | 1.11 | 1.03 | 1.00 | 0.99 |
| Glossiness of Transfer Paper (%) | 69 | 64 | 63 | 66 | 63 | 68 | 68 |
| Internal Bonding strength of Transfer Paper (Nm) | 0.28 | 0.32 | 0.40 | 0.49 | 0.42 | 0.31 | 0.31 |

TABLE 1-continued

| | Example | | | | | | |
|---|---|---|---|---|---|---|---|
| | 1 | 2 | 3 | 4 | 5 | 6 | 7 |
| 180° C. Air Flow Rate (ml/min) | 323 | 282 | 176 | 114 | 305 | 289 | 268 |
| Original Water Content of Transfer Paper just after uncovered and exposed to the ambient air (%) | 4.8 | 4.9 | 5.1 | 4.7 | 5.0 | 4.8 | 5.2 |
| Paper Blistering (28° C., 85 % RH) | ○ | ○ | ○ | ○ | ○ | ○ | ○ |
| Paper Blistering (22° C., 55 % RH) | ○ | ○ | ○ | ○ | ○ | ○ | ○ |
| Toner Blistering (28° C., 85 % RH) | A | B | A | A | A | A | A |
| Toner Blistering (22° C., 55 % RH) | A | A | A | A | A | A | A |
| Waving or Curing of Transfer Paper | B | B | A | A | A | B | B |

TABLE 2

| | Comparative Example | | | | |
|---|---|---|---|---|---|
| | 1 | 2 | 3 | 4 | 5 |
| Weight of Transfer Paper (g/m$^2$) | 105 | 105 | 104.7 | 127.9 | 157 |
| Density of Transfer Paper (g/cm$^3$) | 1.09 | 1.02 | 1.20 | 1.21 | 1.21 |
| Glossiness of Transfer Paper (%) | 66 | 70 | 66 | 67 | 66 |
| Internal Bonding Strength of Transfer Paper (Nm) | 0.32 | 0.28 | 0.31 | 0.29 | 0.25 |
| 180° C. Air Flow Rate (ml/min) | 176 | 324 | 71 | 63 | 56 |
| Original Water Content of Transfer Paper just after uncovered and exposed to the ambient air (%) | 4.9 | 2.5 | 4.9 | 4.8 | 4.8 |
| Paper Blistering (28° C., 85 % RH) | X | ○ | X | X | X |
| Paper Blistering (22° C., 55 % RH) | ○ | ○ | ○ | X | X |
| Toner Blistering (28° C., 85 % RH) | C | A | D | D | D |
| Toner Blistering (22° C., 55 % RH) | C | A | D | D | D |
| Waving or Curing of Transfer Paper | B | D | A | A | C |

As is obvious from Table 1 and Table 2, the samples of Examples 1 to 7 were all substantially free from paper blistering and toner blistering in the ordinary environment (22° C., 55% RH) and in the high-humidity environment (28° C., 85% RH), and were not waved or curled or were waved or curled only a little.

As opposed to those, the samples of Comparative Example 1 were much troubled by paper blistering especially in the high-humidity environment and were much troubled by toner blistering, and the images formed thereon were disordered. This is because the air permeation flow rate through them in image fixation is small and because their internal bonding strength is not enough to resist the water vapor pressure in them. The samples of Comparative Example 2 were waved and curled in the high-humidity environment, thereby causing running troubles such as paper clogging in duplicators or printers. This is because the original water content of the samples is small. The samples of commercially-available coated paper of Comparative Examples 3 to 5 were much troubled by paper blistering and toner blistering. This is because the air flow rate through them in image fixation is small and since their strength is not enough to resist the water vapor pressure in them.

The transfer paper for electrophotography of the invention, having the specific constitution as claimed herein, has high glossiness and good blistering resistance. This is hardly waved or curled while stored and after having been printed thereon, and has good quality.

While the invention has been described in detail and with reference to specific embodiments thereof, it will be apparent to one skilled in the art that various changes and modifications can be made therein without departing from the spirit and scope thereof.

What is claimed is:

1. Transfer paper for electrophotography, which comprises:

a substrate on which both surfaces are coated with a coating layer consisting essentially of a pigment and an adhesive, the adhesive present in an amount of from about 10 to 30 parts by weight to 100 parts by weight of the pigment, wherein the permeation flow rate through the transfer paper of air having been heated at 180° C. and pressurized to have a pressure of 2 kg/cm$^2$ is larger 200 ml/min.

2. The transfer paper for electrophotography as claimed in claim 1, through which the air permeation flow rate is larger than 200 and not more than 900 ml/min.

3. The transfer paper for electrophotography as claimed in claim 1, wherein said coating layer on at least one surface of the substrate has a degree of glossiness of at least 50%.

4. The transfer paper for electrophotography as claimed in claim 1, wherein said coating layer has a density of at most 1.20 g/cm$^3$.

5. The transfer paper for electrophotography as claimed in claim 1, wherein said coating layer has a density of at most 1.10 g/cm$^3$.

6. The transfer paper for electrophotography as claimed in claim 1, wherein the pigment to be in said coating layer is at least one selected from organic pigments, delaminated clay, and pillar-shaped pigments.

7. The transfer paper for electrophotography as claimed in claim 1, wherein said coating layer has a multi-layered structure.

8. The transfer paper for electrophotography as claimed in claim 1, of which the weight falls between 70 g/$m^2$ and 220 g/$m^2$.

9. The transfer paper for electrophotography as claimed in claim 1, of which the water content falls between 3.0% and 6.5%.

10. The transfer paper for electrophotography as claimed in claim 1, of which the water content falls between 4.5% and 5.5%.

11. Transfer paper for electrophotography, which comprises:

a substrate on which both surfaces are coated with a coating layer consisting essentially of a pigment and an adhesive, the adhesive present in an amount of from about 10 to 30 parts by weight to 100 parts by weight of the pigment, wherein the permeation flow rate through the transfer paper of air having been heated at 180° C. and pressurized to have a pressure of 2 kg/$cm^2$ ranges from 50 m/min to 200 ml/min, and wherein the transfer paper has an internal bonding strength of at least 0.38 N·m.

12. The transfer paper for electrophotography as claimed in claim 11, wherein said coating layer on at least one surface of the substrate has a degree of glossiness of at least 50%.

13. The transfer paper for electrophotography as claimed in claim 11, wherein said coating layer has a density of at most 1.20 g/$cm^3$.

14. The transfer paper for electrophotography as claimed in claim 11, wherein said coating layer has a density of at most 1.10 g/$cm^3$.

15. The transfer paper for electrophotography as claimed in claim 11, wherein said substrate consists essentially of pulp and at least 30% of the pulp is needle-leaf bleached kraft pulp (NBKP).

16. The transfer paper for electrophotography as claimed in claim 11, of which the weight falls between 70 g/$m^2$ and 220 g/$m^2$.

17. The transfer paper for electrophotography as claimed in claim 11, of which the water content falls between 3.0% and 6.5%.

18. The transfer paper for electrophotography as claimed in claim 11, of which the water content falls between 4.5% and 5.5%.

19. The transfer paper for electrophotography as claimed in claim 11, of which the internal bonding strength falls between 0.38 N·m and 0.8 N·m.

20. The transfer paper for electrophotography as claimed in claim 11, of which the internal bonding strength falls between 0.4 N·m and 0.7 N·m.

* * * * *